No. 734,454. PATENTED JULY 21, 1903.
A. BAUERMEISTER.
PROCESS OF MAKING PHOTOGRAPHIC COLOR FILTERS.
APPLICATION FILED FEB. 24, 1902.
NO MODEL.
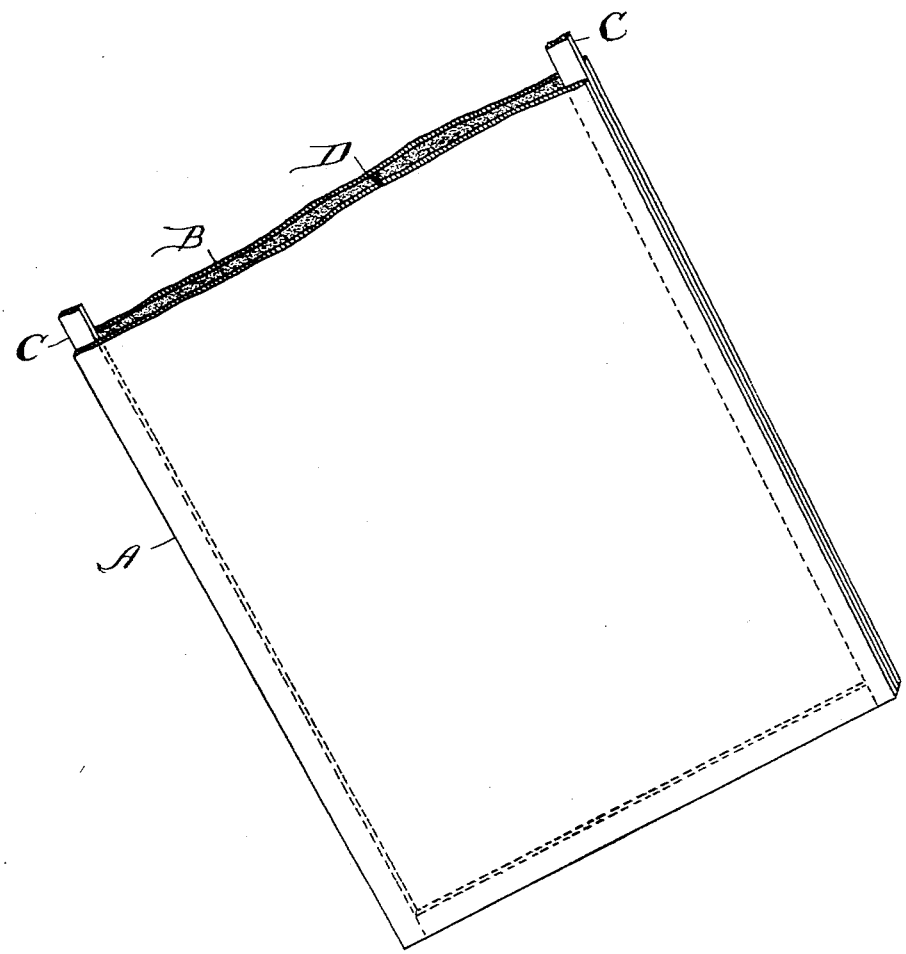
WITNESSES.
Samuel C Percival
Herbert C Bolwell
INVENTOR
Arno Bauermeister
By his Attorneys.
Wheatley & Mackenzie.

No. 734,454. Patented July 21, 1903.

UNITED STATES PATENT OFFICE.

ARNO BAUERMEISTER, OF LEIPZIG, GERMANY, ASSIGNOR TO CARL WILHELM GEORG AARLAND, OF LEIPZIG, GERMANY.

PROCESS OF MAKING PHOTOGRAPHIC COLOR-FILTERS.

SPECIFICATION forming part of Letters Patent No. 734,454, dated July 21, 1903.

Application filed February 24, 1902. Serial No. 95,352. (No specimens.)

*To all whom it may concern:*

Be it known that I, ARNO BAUERMEISTER, a subject of the Emperor of Germany, (whose post-office address is 11 Südplatz, Leipzig, Germany,) have invented certain new and useful Improvements in Processes of Making Photographic Color-Filters; and I do hereby declare the following to be a full, clear, and exact description of the invention, such as will enable others skilled in the art to which it appertains to make and use the same.

Hitherto color-filters employed in the production of negatives for three-color printing and similar purposes have been produced in the following manner: A glass plate is coated either with suitably-colored collodion or gelatin dissolved in water, with the addition of a small quantity of glycerin or with lac. After drying the filters so obtained are provided with a second glass plate and in certain cases cemented with Canada balsam. The production of filters in large sizes according to such process is exceedingly difficult and involves a great expenditure of time. When the color is simply poured on, it is impossible to insure uniform drying. Opaque spots and streaks are found on the surface, and later on cracks appear in the layer of color. Some of these faults are visible with the naked eye, but more frequently can only be discerned with a spectroscope. Moreover, simply covering the filters thus obtained with protecting glass plates is not sufficient, as in consequence of the entrance of air and moisture the binding medium and the color are easily affected. In order to avoid this, the plates are cemented with Canada balsam. The heating, however, which is necessary for this purpose causes the glass to shrink and affects the layer of color.

In the drawing I have illustrated a color-filter constructed according to my invention.

In order to avoid the hereinbefore-recited disadvantages, I proceed in the following manner: Small strips C, of glass or similar material, of suitable but uniform thickness, are fastened to the edges of the glass plate B, so that a shallow "trough" is produced. Into this trough gelatin, isinglass, or other animal and vegetable gums, as D, dissolved in pure glycerin, as well as fibrin, either alone or mixed, and a suitable coloring-matter are poured at the requisite temperature. Hereupon the second glass plate A is put on and the whole left to cool under pressure. After the pressure is removed the filter is ready. Only in this way—that is, by using substances dissolved in pure glycerin and by the pouring out of the trough previously formed—is it possible to produce entirely satisfactory filters in exceedingly large sizes for scientific and practical purposes. Even when the known mixture of water, color, and glycerin is poured into such a glass plate, formed like a trough, the intended purpose may not be attained, as by the evaporation of the water added to the color cracks would appear in the layer. As the coloring material in this process remains in solution no separation of the coloring material, crystallizing, or uneven distribution can occur, so that the color-filters produced in this way can be used for an almost unlimited time. The thickness of the layer of colors depends upon the thickness of the intermediate strips of glass, which must of course be uniform throughout. As soon as the second glass plate is firmly connected with the strips of glass the color-filter must produce the same effect in all parts when photographs are taken.

By the new process it is also possible to produce filters of any size easily and accurately, whereas by the processes of production hitherto employed only small color-filters can be prepared, as in consequence of the difficulty of obtaining a uniform layer of color on the glass plate in the production of large-size filters a filter is produced which in no way meets practical requirements.

Mixtures for color-filters are produced in the following manner; but it should be observed that these mixtures must be adapted to the particular purpose, the kind of plates, and the like—that is, must be altered with regard to the coloring-matter addition. As a base the following is employed: a solution of fifty grams of gelatin in three hundred cubic centimeters of pure glycerin with an addition of some medium for the purpose of preventing fermentation. A violet filter for dry-colored print can be produced by dissolving one gram of Paris violet in four hundred cubic centimeters of glycerin and mixing thirty-five centimeters thereof with one hundred grams of the said medium for preventing fermentation. For yellow filters for orthochromatic work one gram of tautrazin is dissolved in fifty centimeters of glycerin and to forty centimeters thereof ninety grams of the medium for preventing fermentation are added.

What I claim, and desire to secure by Letters Patent, is—

The herein-described process of producing color-filters for photographic and other purposes, which consists in mixing gelatin dissolved in glycerin with coloring material and a media for preventing fermentation, then pouring the mixture into a shallow glass trough and then closing the trough with a glass plate and allowing the whole to cool under pressure.

In testimony whereof I have affixed my signature in presence of two witnesses.

ARNO BAUERMEISTER.

Witnesses:
HERM. TARK,
RUDOLPH FRICKE.